United States Patent
Birk

(10) Patent No.: US 6,313,585 B1
(45) Date of Patent: Nov. 6, 2001

(54) METHOD FOR DIMMING A FLUORESCENT LAMP ARRANGED IN THE SECONDARY CIRCUIT OF A TRANSFORMER AND ARRANGEMENT TO IMPLEMENT SAID METHOD

(75) Inventor: Berthold Birk, Aschaffenburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/402,620
(22) PCT Filed: Apr. 17, 1998
(86) PCT No.: PCT/EP98/02289
§ 371 Date: Jan. 14, 2000
§ 102(e) Date: Jan. 14, 2000
(87) PCT Pub. No.: WO98/48598
PCT Pub. Date: Oct. 29, 1998

(30) Foreign Application Priority Data

Apr. 24, 1997 (DE) .............................. 197 17 307

(51) Int. Cl.$^7$ .................................................. H05B 37/02
(52) U.S. Cl. .......................................... 315/219; 315/307
(58) Field of Search ................................ 315/307, 209 R, 315/219, DIG. 4, 169.4, 291, 308, DIG. 7, DIG. 5, 244

(56) References Cited

U.S. PATENT DOCUMENTS

| | | | |
|---|---|---|---|
| 4,370,600 | * | 1/1983 | Zansky .................................. 315/244 |
| 4,463,286 | * | 7/1984 | Justice .................................. 315/219 |
| 4,469,988 | * | 9/1984 | Cronin .............................. 315/209 R |
| 4,686,427 | | 8/1987 | Burke .................................. 315/219 |
| 5,192,896 | * | 3/1993 | Qin ....................................... 315/224 |
| 5,311,104 | | 5/1994 | Antle .................................... 315/307 |
| 5,420,481 | | 5/1995 | McCanney ........................... 315/291 |
| 5,907,223 | * | 5/1999 | Gu et al. .............................. 315/247 |
| 5,990,663 | * | 11/1999 | Hirschmann et al. ............... 315/289 |
| 6,118,228 | * | 9/2000 | Pal ....................................... 315/307 |

FOREIGN PATENT DOCUMENTS

| | | |
|---|---|---|
| 4222634 | 1/1994 | (DE) . |
| 0210830 | 2/1987 | (EP) . |
| 0599598 | 6/1994 | (EP) . |
| 2047486 | 11/1980 | (GB) . |
| 9703541 | 1/1997 | (WO) . |

* cited by examiner

*Primary Examiner*—Don Wong
*Assistant Examiner*—Trinh Vo Dinh
(74) *Attorney, Agent, or Firm*—Martin A. Farber

(57) ABSTRACT

A method for dimming a fluorescent lamp, in which a transformer is driven by an AC voltage in a push-pull manner. In a method which ensures flicker-free light emission over a wide temperature range at the highest possible dimming rate, a resonant circuit containing the current transformer, the secondary capacitance element and the fluorescent lamp is momentarily made to oscillate in an ionization phase in such a way that the fluorescent lamp is reliably prevented from illuminating, and then the fluorescent lamp is positively controlled.

10 Claims, 3 Drawing Sheets

METHOD FOR DIMMING A FLUORESCENT LAMP ARRANGED IN THE SECONDARY CIRCUIT OF A TRANSFORMER AND ARRANGEMENT TO IMPLEMENT SAID METHOD

FIELD AND BACKGROUND OF THE INVENTION

The invention relates to a method for dimming a fluorescent lamp arranged in the secondary circuit of a transformer, in which the transformer is driven in a push-pull manner with pulse trains of adjustable duration on the primary side, and also to an arrangement for carrying out the method.

For many applications it is necessary for the brightness of fluorescent lamps to be varied over a large range of adjustment. That is important for example in the context of illuminating display devices in motor vehicles. Such a large range of adjustment is necessary in this case owing to the great fluctuations in the ambient light, in particular between day and night.

Arrangements for operating a fluorescent lamp with controllable luminance are known in which the discharge path of the fluorescent lamp is connected to a controllable AC source via a transformer. The current of the current source is fed to the primary winding of the transformer via two switches operating in a push-pull manner. The switches are in this case driven by a push-pull generator.

Cold-cathode fluorescent lamps have an ignition delay time, that is to say that after the application of an AC voltage to the lamp, a certain period of time lapses before the cold-cathode fluorescent lamp emits light. This ignition delay time is not constant and, moreover, is temperature-dependent. With sine-beat driving of the cold-cathode fluorescent lamp and a lamp that is dimmed to great extent, the fluctuation in the ignition delay time is greater than the period of time in which the lamp emits light. Flickering of the fluorescent lamp occurs as a consequential phenomenon.

In accordance with WO 97/03541, the period of time in which the fluorescent lamp is lit is controlled in order, in this way, to minimize the flickering of the fluorescent lamp.

U.S. Pat. No. 5,311,104 proposes applying an additional ignition pulse, generated by a separate ignition device, to the fluorescent lamp in each case before the beginning of the individual pulse trains.

In accordance with DE 42 22 634 A1, a method for operating a fluorescent lamp is known in which there are generated an AC voltage having a relatively high frequency as operating voltage and a square-wave voltage having a relatively low frequency with an adjustable pulse width for periodically inhibiting and enabling the AC voltage at the fluorescent lamp. In this case, the effect achieved with the aid of a delay device is that the undelayed pulses trigger the ignition pulses, while the delayed pulses lead to the interruption of the electric circuit.

SUMMARY OF THE INVENTION

Consequently, the invention is based on the object of specifying the method which ensures flicker-free light emission over a wide temperature range at the highest possible dimming rate without additional outlay on equipment.

The advantage of the invention is that after the momentary activation of the resonant circuit, the gas in the cold-cathode fluorescent lamp can be ionized and organized and the cold-cathode fluorescent lamp can immediately emit light in a flicker-free manner during subsequent normal operation.

In a refinement, the transformer is driven by individual pulses which are variable in respect of number and/or frequency and/or waveform and also the DC voltage component.

In a development of the method, a drive intermission for the ionization of the fluorescent lamp takes place between the ionization phase and the positive control of the fluorescent lamp.

In an advantageous manner, after the conclusion of the positive control of the fluorescent lamp, energy is drawn from the resonant circuit by the two switches being driven simultaneously. The light emission of the cold-cathode fluorescent lamp terminates immediately.

In one realization of the method according to the invention, an arrangement has a fluorescent lamp in the secondary circuit of the transformer, which fluorescent lamp can be driven via an impedance. The primary circuit of the transformer is connected to a first and a second switch, which switch in a push-pull manner and are driven by a control logic unit.

The switches are advantageously designed as MOS field-effect transistors.

In order to ensure reliable ignition of the cold-cathode fluorescent lamp under all operating conditions, the highest possible ignition voltage is worked with. In order to limit the maximum permissible secondary voltage of the transformer, two reverse-connected series zener diodes are arranged on the primary side.

In a development, a shunt resistor is arranged at the reference-ground point of the MOS field-effect transistors and is connected via a comparator to the control logic unit. Current regulation is thereby realized by superposed pulsing of the field-effect transistors.

BRIEF DESCRIPTION OF THE DRAWINGS

The invention permits numerous embodiments. One of these will be explained in more detail with reference to the figures which are illustrated in the drawings, in which.

DETAILED DESCRIPTION OF THE PREFERRED EMBODIMENTS

Figure 1:
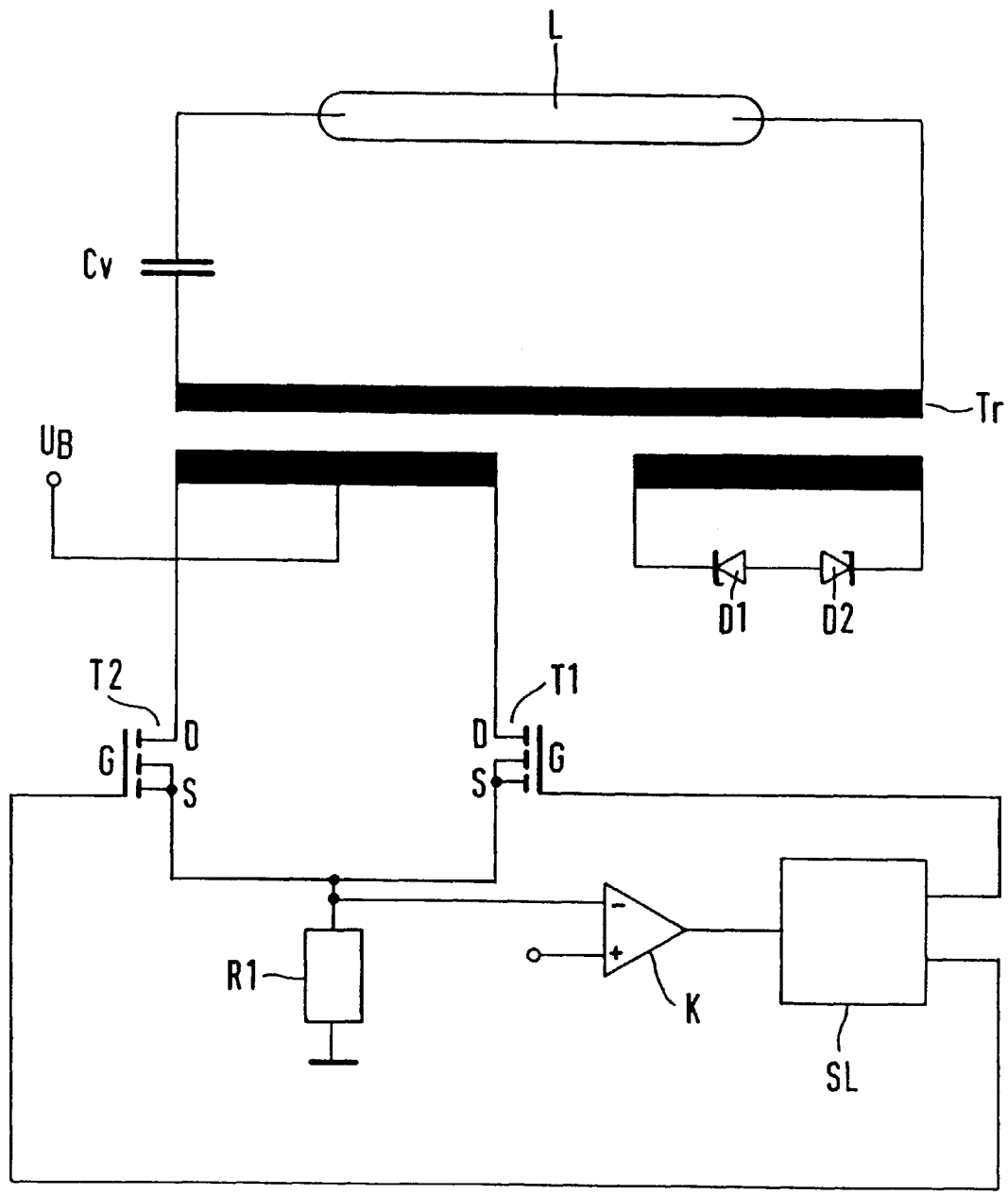
FIG. 1 shows a circuit arrangement for driving a cold-cathode fluorescent lamp.

FIG. 1 shows a cold-cathode fluorescent lamp L arranged in the secondary circuit of a transformer Tr. The fluorescent lamp L is connected to the secondary circuit of the transformer Tr via a high-voltage capacitor $C_y$. The transformer Tr is energized in its primary circuit by two MOSFET transistors T1 and T2, which switch in a push-pull manner and are driven by a control logic unit SL.

This control logic unit SL processes a voltage drop across a shunt resistor R1, which is arranged between the control electrodes of the MOSFET transistors T1, T2 and ground, as input signal. The voltage drop is fed to the inverting input of a comparator K, to whose non-inverting input a reference voltage $U_{REF}$ is applied.

The output of comparator K is connected to the control logic unit SL.

Two reverse-connected series zener diodes D1 and D2 are arranged in a third winding of the primary circuit of the transformer Tr. Since reliable ignition of the cold-cathode fluorescent lamp is to be ensured under all operating conditions, the ignition voltage must be as large as possible. The secondary voltage of the transformer Tr is limited on the primary side with the aid of the diode arrangement described.

Figure 2A:
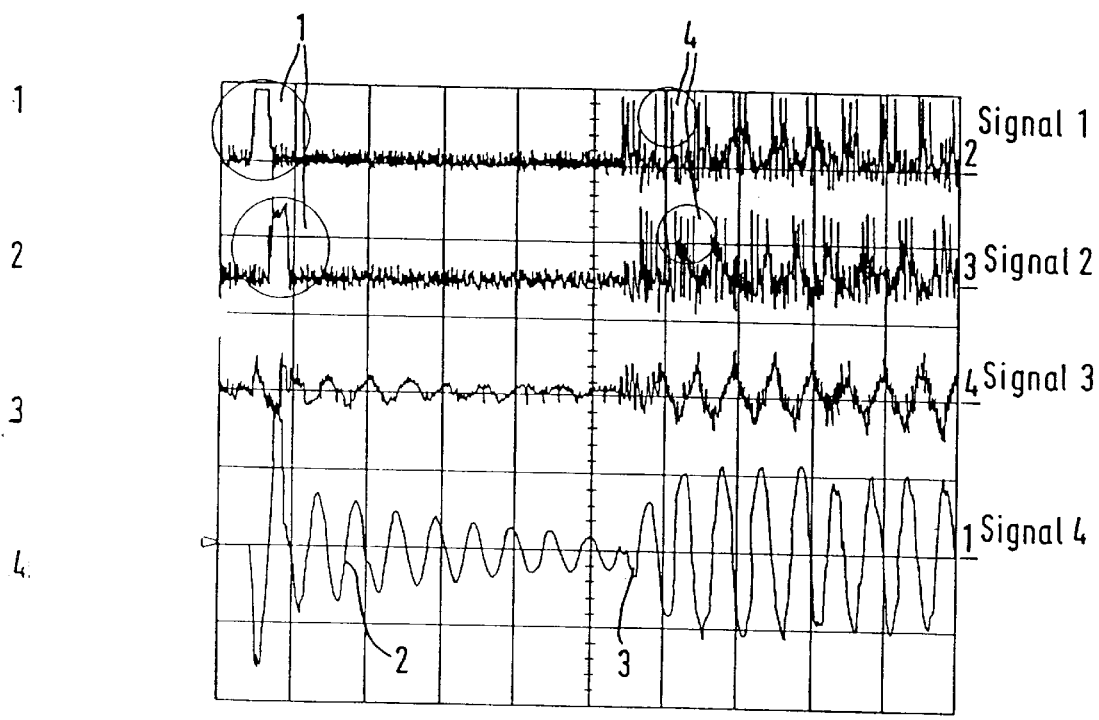
FIGS. 2a, b show timing diagrams relating to the driving of the cold-cathode fluorescent lamp.

The function of the driving of the cold-cathode fluorescent lamp L is explained below with reference to FIGS. 2a and b. In this case, the following are plotted against time Signal 1 drive signal at the MOSFET T1

Signal 2 drive signal at the MOSFET T2

Signal 3 current through the cold-cathode fluorescent lamp L

Signal 4 voltage across the cold-cathode fluorescent lamp L

The two MOSFET transistors T1, T2 are successively driven once with a pulse 1 in each case. The resonant circuit comprising the current transformer Tr, the high-voltage capacitor $C_v$ and the fluorescent lamp L is activated as a result of this. The resonant circuit decays exponentially (cf. signal 4, point 2 in FIG. 2a). The gas in the cold-cathode fluorescent lamp L can be ionized and organized in this time. A specific time after the initial activation of the resonant circuit, for example after 80 μsec, the transistors T1, T2 are continuously driven reciprocally in the customary manner (signals 1 and 2, point 4). Starting from this point in time, the cold-cathode fluorescent lamp L immediately emits light (as can be inferred from signal 4 at point 3).

Figure 2B:
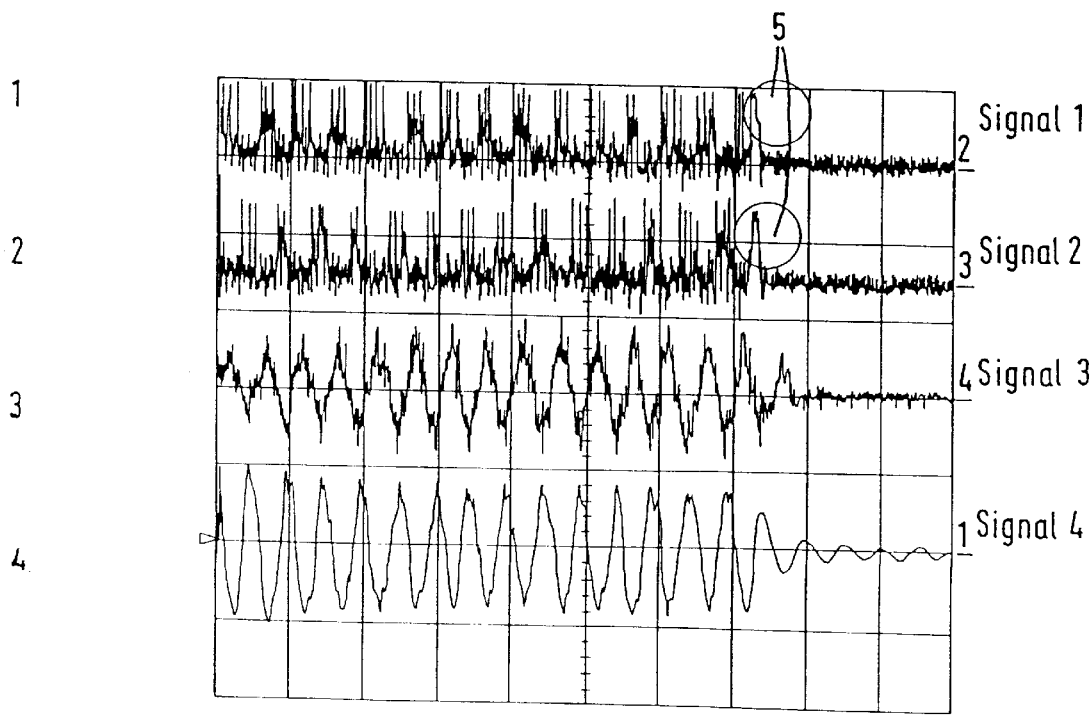

After the desired number of drive pulses, the two MOSFET transistors are driven simultaneously, as revealed in FIG. 2b, signals 1 and 2 at the instant 5. As a result of this, the energy is abruptly drawn from the resonant circuit Tr, $C_v$, L and the light emission of the cold-cathode fluorescent lamp terminates immediately.

At room temperature, a flicker-free dimming range of approximately 10,000:1 was achieved with a cold-cathode fluorescent lamp having a rated luminance of 16,000 cd/m$^2$.

The method according to the invention has the advantage that the flicker-free operation of the fluorescent lamp L is achieved just by the targeted driving of the MOSFET transistors T1, T2. Extensive control circuits of the kind that are usually customary can be dispensed with.

Figure 3A:
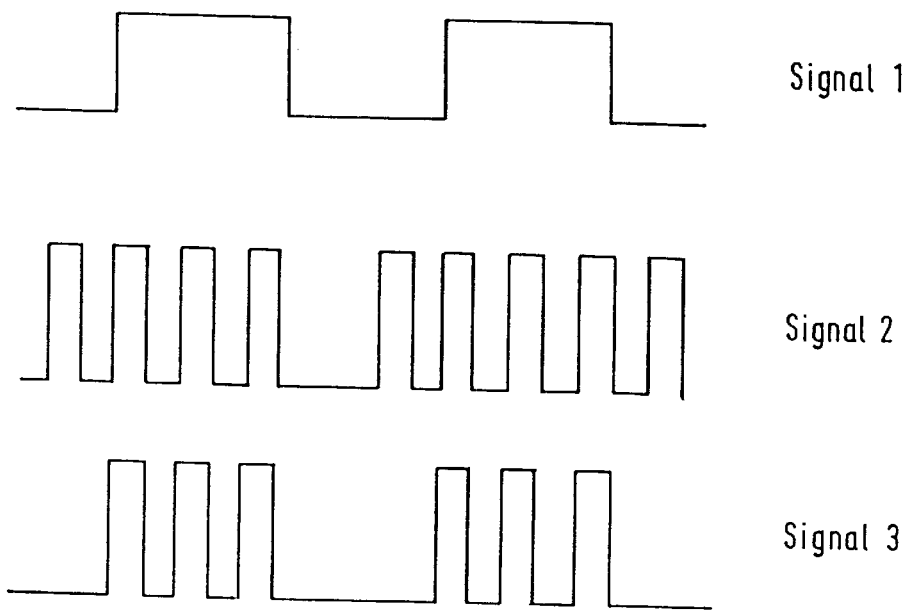
FIGS. 3a, b show timing diagrams relating to the current limiting of the cold-cathode fluorescent lamp.

FIG. 3a illustrates the drive time of the MOSFET transistor T2 in connection with the current limiting.

The control logic unit SL drives the MOSFET transistor T2 in a pulsed manner (FIG. 3a, signal 1). The current flowing through the MOSFET transistor T2 is measured as a voltage drop across the shunt resistor R1 and evaluated by the comparator K, which emits a low or high signal depending on whether or not the measured voltage exceeds the reference value. (FIG. 3a, signal 2.) The output signal of the comparator K is logically combined with the signal 1 in the control logic unit SL. The result of this is that the MOSFET transistor T2 is turned on or turned off during the driving by the control logic unit SL in time with the output signal of the comparator K.

Figure 3B:
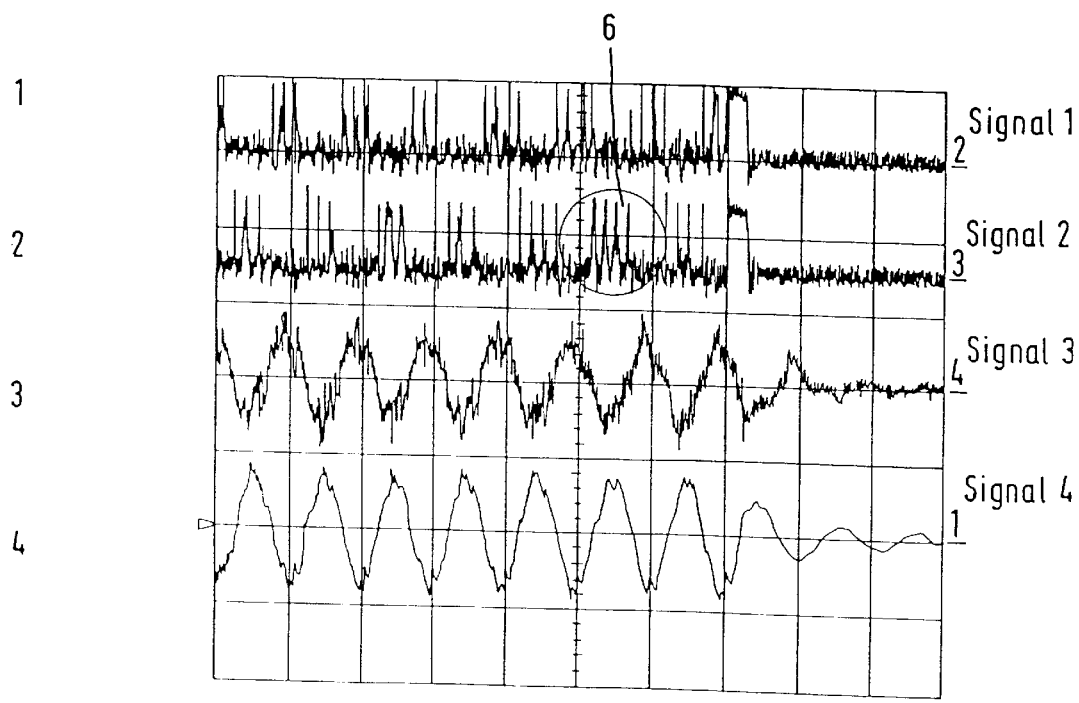

If the current is too large, the transistor T2 is thus switched off, which is illustrated in FIG. 3a, signal 3 and in FIG. 3b, signal 2 at the instant 6. In FIG. 3a, the signal 1 thus represents the envelope for the signal 3.

The same procedure applies to the MOSFET transistor T1, the two transistors T1 and T2 being alternately driven by the control logic unit SL. The comparator output signal illustrated in FIG. 3a, signal 2 shows that the evaluation for both transistors is performed via the same shunt resistor R1.

This measure means that the current regulator with power transistor and associated driving that is otherwise usually required can be obviated.

What is claimed is:

1. A method for dimming a fluorescent lamp arranged in a secondary circuit of a transformer, in which the transformer is driven in a push-pull manner with pulse trains of adjustable duration on the primary side, wherein a resonant circuit (Tr, $C_v$ containing the fluorescent lamp (L) is momentarily made to oscillate, before the beginning of each pulse train for the ionization of the fluorescent lamp gas, in such a way that the fluorescent lamp (L) is reliably prevented from illuminating, and wherein the fluorescent lamp (L) is positively controlled in a manner known per se once ionization has occurred.

2. The method as claimed in claim 1, wherein the transformer (Tr) is driven by individual pulses.

3. The method as claimed in claim 2, wherein the individual pulses are variable in respect of number of consecutive pulses and/or frequency and/or amplitude and also a DC voltage component.

4. The method as claimed in claim 1, wherein an adjustable drive intermission for the ionization of the fluorescent lamp takes place between the ionization phase and the positive control of the fluorescent lamp (L).

5. The method as claimed in claim 1, wherein a forced decay of the resonant circuit (Tr, $C_v$) takes place at the end of each pulse train as a result of the transformer (Tr) being short-circuited on the primary side.

6. An arrangement for carrying out the method as claimed in claim 1, wherein a fluorescent lamp (L) is driven via an impedance ($C_v$) in the secondary circuit of the transformer (Tr) and the primary circuit of which transformer is connected to a first and to a second switch (T1, T2), which switch in a push-pull manner and are driven by a control logic unit (SL).

7. The arrangement as claimed in claim 6, wherein the switches (T1, T2) are MOS field-effect transistors.

8. The arrangement as claimed in claim 6, wherein the secondary voltage of the transformer (Tr) is limited by two reverse-connected series zener diodes (D1, D2) via an auxiliary winding on the primary side.

9. The arrangement as claimed in claim 7, wherein a shunt resistor (R1) is arranged at the common reference-ground point of the MOS field-effect transistors and is connected via a comparator (K) to the control logic unit (SL), whereby current regulation is realized by superposed pulsing of the field-effect transistors.

10. The method as claimed in claim 1, wherein, wherein a dimming range of the fluorescent lamp is approximately in the range of 0.01% of rated light intensity of the fluorescent lamp.

* * * * *